(12) United States Patent
Tian et al.

(10) Patent No.: US 8,948,260 B2
(45) Date of Patent: Feb. 3, 2015

(54) ADAPTIVE GOP STRUCTURE IN VIDEO STREAMING

(75) Inventors: Tao Tian, San Diego, CA (US); Vijayalakshmi R. Raveendran, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1455 days.

(21) Appl. No.: 11/538,023

(22) Filed: Oct. 2, 2006

(65) Prior Publication Data

US 2007/0171972 A1 Jul. 26, 2007

Related U.S. Application Data

(60) Provisional application No. 60/727,640, filed on Oct. 17, 2005.

(51) Int. Cl.

| | |
|---|---|
| *H04N 7/12* | (2006.01) |
| *H04N 19/61* | (2014.01) |
| *H04N 7/01* | (2006.01) |
| *H04N 19/87* | (2014.01) |
| *H04N 19/132* | (2014.01) |
| *H04N 19/107* | (2014.01) |
| *H04N 19/109* | (2014.01) |

(Continued)

(52) U.S. Cl.
CPC ........... *H04N 19/00139* (2013.01); *H04N 7/50* (2013.01); *H04N 7/0112* (2013.01); *H04N 19/00921* (2013.01); *H04N 19/00127* (2013.01); *H04N 19/0003* (2013.01); *H04N 19/00036* (2013.01); *H04N 19/00018* (2013.01); *H04N 19/00145* (2013.01); *H04N 19/00781* (2013.01); *H04N 19/00163* (2013.01); *H04N 19/00054* (2013.01); *H04N 19/00278* (2013.01); *H04N 7/012* (2013.01); *H04N 19/00266* (2013.01)

USPC .................................................... 375/240.13

(58) Field of Classification Search
CPC ...................................................... H04N 7/50
USPC ...................................................... 375/240.13
See application file for complete search history.

(56) References Cited

U.S. PATENT DOCUMENTS

| | | | |
|---|---|---|---|
| 5,289,276 | A | 2/1994 | Siracusa et al. |
| 5,404,174 | A | 4/1995 | Sugahara |

(Continued)

FOREIGN PATENT DOCUMENTS

| | | |
|---|---|---|
| CL | 14732005 | 12/2001 |
| CL | 1332005 | 10/2005 |

(Continued)

OTHER PUBLICATIONS

Lee J, "A fast frame type selection technique for very low bit rate coding using MPEG-1" Real-Time Imaging, Academic Press Limited, GB, vol. 5, No. 2, Apr. 1999, pp. 83-94.

(Continued)

*Primary Examiner* — Sath V Perungavoor
*Assistant Examiner* — James Pontius
(74) *Attorney, Agent, or Firm* — Brent A. Boyd (57) ABSTRACT

This system adaptively assigns picture types used for temporal compression to frames of streaming video at the input. Based on threshold testing of two metrics that are measures of distance between the frames at the input, a frame may be assigned to be compressed as an I, P, or B frame or be skipped over by the system without being coded at all.

22 Claims, 5 Drawing Sheets

(51) Int. Cl.
*H04N 19/136* (2014.01)
*H04N 19/103* (2014.01)
*H04N 19/137* (2014.01)
*H04N 19/142* (2014.01)
*H04N 19/114* (2014.01)
*H04N 19/176* (2014.01)
*H04N 19/172* (2014.01)

(56) References Cited

U.S. PATENT DOCUMENTS

| | | | |
|---|---|---|---|
| 5,508,752 A | 4/1996 | Kim et al. | |
| 5,565,920 A * | 10/1996 | Lee et al. | 375/240.11 |
| 5,598,428 A | 1/1997 | Sato | |
| 5,619,272 A | 4/1997 | Salmon et al. | |
| 5,642,294 A | 6/1997 | Taniguchi et al. | |
| 5,642,460 A | 6/1997 | Shimoda | |
| 5,654,805 A | 8/1997 | Boon | |
| 5,682,204 A | 10/1997 | Uz et al. | |
| 5,684,917 A | 11/1997 | Yanagihara et al. | |
| 5,686,962 A | 11/1997 | Chung et al. | |
| 5,699,119 A | 12/1997 | Chung et al. | |
| 5,745,645 A | 4/1998 | Nakamura et al. | |
| 5,754,233 A | 5/1998 | Takashima | |
| 5,771,357 A | 6/1998 | Kato et al. | |
| 5,790,179 A | 8/1998 | Shibata et al. | |
| 5,793,895 A | 8/1998 | Chang et al. | |
| 5,801,765 A | 9/1998 | Gotoh et al. | |
| 5,821,991 A | 10/1998 | Kwok | |
| 5,835,163 A | 11/1998 | Liou et al. | |
| 5,841,939 A | 11/1998 | Takahashi et al. | |
| 5,864,369 A | 1/1999 | Swan | |
| 5,929,902 A | 7/1999 | Kwok | |
| 5,960,148 A | 9/1999 | Miyazawa | |
| 5,978,029 A | 11/1999 | Boice et al. | |
| 5,991,502 A | 11/1999 | Kawakami et al. | |
| 6,012,091 A | 1/2000 | Boyce | |
| 6,014,493 A | 1/2000 | Shimoda | |
| 6,064,796 A | 5/2000 | Nakamura et al. | |
| 6,091,460 A | 7/2000 | Hatano et al. | |
| 6,115,499 A | 9/2000 | Wang et al. | |
| 6,157,674 A | 12/2000 | Oda et al. | |
| 6,175,593 B1 | 1/2001 | Kim et al. | |
| 6,229,925 B1 | 5/2001 | Alexandre et al. | |
| 6,317,518 B1 | 11/2001 | Enari | |
| 6,333,950 B1 | 12/2001 | Karasawa | |
| 6,363,114 B1 | 3/2002 | Kato | |
| 6,370,672 B1 | 4/2002 | Rick et al. | |
| 6,449,002 B1 | 9/2002 | Markman et al. | |
| 6,473,459 B1 | 10/2002 | Sugano et al. | |
| 6,490,320 B1 | 12/2002 | Vetro et al. | |
| 6,501,796 B1 | 12/2002 | Dusseux et al. | |
| 6,507,618 B1 | 1/2003 | Wee et al. | |
| 6,538,688 B1 | 3/2003 | Giles | |
| 6,539,220 B1 | 3/2003 | Sakai et al. | |
| 6,553,068 B1 | 4/2003 | Wake et al. | |
| 6,574,211 B2 | 6/2003 | Padovani et al. | |
| 6,580,829 B1 | 6/2003 | Hurst, Jr. et al. | |
| 6,600,836 B1 | 7/2003 | Morley et al. | |
| 6,718,121 B1 | 4/2004 | Shikunami | |
| 6,721,492 B1 | 4/2004 | Togashi | |
| 6,724,819 B1 | 4/2004 | Takaki et al. | |
| 6,744,474 B2 | 6/2004 | Markman | |
| 6,773,437 B2 | 8/2004 | Ogilvie et al. | |
| 6,784,942 B2 | 8/2004 | Selby et al. | |
| 6,791,602 B1 | 9/2004 | Sasaki et al. | |
| 6,798,834 B1 | 9/2004 | Murakami et al. | |
| 6,891,891 B2 | 5/2005 | Pau et al. | |
| 6,900,846 B2 | 5/2005 | Lee et al. | |
| 6,904,081 B2 | 6/2005 | Frank | |
| 6,909,745 B1 | 6/2005 | Puri et al. | |
| 6,928,151 B2 | 8/2005 | Yamada et al. | |
| 6,934,335 B2 | 8/2005 | Liu et al. | |
| 6,952,500 B2 | 10/2005 | Sheraizin et al. | |
| 6,959,044 B1 | 10/2005 | Jin et al. | |
| 6,970,506 B2 | 11/2005 | Kim et al. | |
| 6,985,635 B2 | 1/2006 | Chen et al. | |
| 6,987,728 B2 | 1/2006 | Deshpande | |
| 6,996,186 B2 | 2/2006 | Ngai et al. | |
| 7,009,656 B2 | 3/2006 | Thomson et al. | |
| 7,027,512 B2 | 4/2006 | Jeon | |
| 7,039,855 B2 | 5/2006 | Nikitin et al. | |
| 7,042,512 B2 | 5/2006 | Yang et al. | |
| 7,075,581 B1 | 7/2006 | Ozgen et al. | |
| 7,089,313 B2 | 8/2006 | Lee et al. | |
| 7,093,028 B1 | 8/2006 | Shao et al. | |
| 7,095,814 B2 | 8/2006 | Kyeong et al. | |
| 7,095,874 B2 | 8/2006 | Moskowitz et al. | |
| 7,123,816 B2 | 10/2006 | McGrath et al. | |
| 7,129,990 B2 | 10/2006 | Wredenhagen et al. | |
| 7,136,417 B2 | 11/2006 | Rodriguez | |
| 7,139,551 B2 | 11/2006 | Jamadagni | |
| 7,142,599 B2 | 11/2006 | Henocq | |
| 7,154,555 B2 | 12/2006 | Conklin | |
| 7,167,507 B2 | 1/2007 | Mailaender et al. | |
| 7,203,236 B2 | 4/2007 | Yamada | |
| 7,203,238 B2 | 4/2007 | Liu et al. | |
| 7,280,708 B2 | 10/2007 | Song et al. | |
| 7,339,980 B2 | 3/2008 | Grant et al. | |
| 7,356,073 B2 | 4/2008 | Heikkila | |
| 7,359,466 B2 | 4/2008 | Huang et al. | |
| 7,430,336 B2 | 9/2008 | Raveendran | |
| 7,433,982 B2 | 10/2008 | Peev et al. | |
| 7,443,448 B2 | 10/2008 | Yang et al. | |
| 7,474,701 B2 | 1/2009 | Boice et al. | |
| 7,479,978 B2 | 1/2009 | Cho et al. | |
| 7,483,581 B2 | 1/2009 | Raveendran et al. | |
| 7,486,736 B2 | 2/2009 | Zhidkov | |
| 7,528,887 B2 | 5/2009 | Wyman | |
| 7,529,426 B2 | 5/2009 | Neuman | |
| 7,536,626 B2 | 5/2009 | Agrawal et al. | |
| 7,557,861 B2 | 7/2009 | Wyman et al. | |
| 7,634,260 B2 | 12/2009 | Chun | |
| 7,660,987 B2 | 2/2010 | Baylis et al. | |
| 7,676,106 B2 | 3/2010 | Panusopone et al. | |
| 7,705,913 B2 | 4/2010 | Jia et al. | |
| 7,738,716 B2 | 6/2010 | Song | |
| 7,840,112 B2 | 11/2010 | Rao | |
| 8,060,720 B2 | 11/2011 | Uppala | |
| 2001/0001614 A1 * | 5/2001 | Boice et al. | 375/240.24 |
| 2001/0017888 A1 | 8/2001 | Bruls | |
| 2001/0055337 A1 | 12/2001 | Matsuzaki et al. | |
| 2002/0021485 A1 | 2/2002 | Pilossof | |
| 2002/0037051 A1 | 3/2002 | Takenaka | |
| 2002/0047936 A1 | 4/2002 | Tojo | |
| 2002/0054621 A1 | 5/2002 | Kyeong et al. | |
| 2002/0097791 A1 | 7/2002 | Hansen | |
| 2002/0146071 A1 | 10/2002 | Liu et al. | |
| 2002/0149703 A1 | 10/2002 | Adams et al. | |
| 2002/0150162 A1 * | 10/2002 | Liu et al. | 375/240.17 |
| 2002/0154705 A1 | 10/2002 | Walton et al. | |
| 2002/0163964 A1 | 11/2002 | Nichols | |
| 2003/0021485 A1 | 1/2003 | Raveendran et al. | |
| 2003/0142762 A1 | 7/2003 | Burke | |
| 2003/0185302 A1 | 10/2003 | Abrams, Jr. | |
| 2003/0219160 A1 | 11/2003 | Song et al. | |
| 2004/0013196 A1 | 1/2004 | Takagi et al. | |
| 2004/0045038 A1 | 3/2004 | Duff et al. | |
| 2004/0073901 A1 | 4/2004 | Imamatsu | |
| 2004/0125877 A1 | 7/2004 | Chang et al. | |
| 2004/0136566 A1 | 7/2004 | Cho et al. | |
| 2004/0190609 A1 | 9/2004 | Watanabe | |
| 2004/0192274 A1 | 9/2004 | Vuori | |
| 2004/0264790 A1 | 12/2004 | Song et al. | |
| 2005/0022178 A1 | 1/2005 | Ghafoor et al. | |
| 2005/0062885 A1 | 3/2005 | Kadono et al. | |
| 2005/0063500 A1 | 3/2005 | Li et al. | |
| 2005/0076057 A1 | 4/2005 | Sharma et al. | |
| 2005/0078750 A1 | 4/2005 | Shen et al. | |
| 2005/0081482 A1 | 4/2005 | Lembo | |
| 2005/0134735 A1 | 6/2005 | Swartz | |
| 2005/0168634 A1 | 8/2005 | Wyman et al. | |
| 2005/0168656 A1 | 8/2005 | Wyman et al. | |
| 2005/0185719 A1 | 8/2005 | Hannuksela | |

(56) References Cited

U.S. PATENT DOCUMENTS

| | | |
|---|---|---|
| 2005/0192878 A1 | 9/2005 | Minear et al. |
| 2005/0195889 A1 | 9/2005 | Grant et al. |
| 2005/0195899 A1 | 9/2005 | Han |
| 2005/0201478 A1 | 9/2005 | Claussen et al. |
| 2005/0222961 A1 | 10/2005 | Staib et al. |
| 2005/0231635 A1 | 10/2005 | Lin |
| 2005/0249282 A1 | 11/2005 | Landsiedel et al. |
| 2005/0254692 A1 | 11/2005 | Caldwell |
| 2005/0265461 A1 | 12/2005 | Raveendran |
| 2006/0002340 A1 | 1/2006 | Criss et al. |
| 2006/0023788 A1 | 2/2006 | Otsuka et al. |
| 2006/0129646 A1 | 6/2006 | Rhee et al. |
| 2006/0133514 A1 | 6/2006 | Walker |
| 2006/0146934 A1 | 7/2006 | Caglar et al. |
| 2006/0153294 A1 | 7/2006 | Wang et al. |
| 2006/0159160 A1 | 7/2006 | Kim et al. |
| 2006/0166739 A1 | 7/2006 | Lin |
| 2006/0197879 A1 | 9/2006 | Covell et al. |
| 2006/0210184 A1 | 9/2006 | Song et al. |
| 2006/0215539 A1 | 9/2006 | Vrcelj et al. |
| 2006/0215761 A1 | 9/2006 | Shi et al. |
| 2006/0222078 A1 | 10/2006 | Raveendran et al. |
| 2006/0230162 A1 | 10/2006 | Chen et al. |
| 2006/0233239 A1 | 10/2006 | Sethi et al. |
| 2006/0239347 A1 | 10/2006 | Koul |
| 2006/0244840 A1 | 11/2006 | Eshet et al. |
| 2006/0282737 A1 | 12/2006 | Shi et al. |
| 2007/0014354 A1 | 1/2007 | Murakami et al. |
| 2007/0074266 A1 | 3/2007 | Raveendran et al. |
| 2007/0081586 A1 | 4/2007 | Raveendran et al. |
| 2007/0081587 A1 | 4/2007 | Raveendran et al. |
| 2007/0081588 A1 | 4/2007 | Raveendran et al. |
| 2007/0097259 A1 | 5/2007 | MacInnis et al. |
| 2007/0124443 A1 | 5/2007 | Nanda et al. |
| 2007/0124459 A1 | 5/2007 | Kasama |
| 2007/0160128 A1 | 7/2007 | Tian et al. |
| 2007/0160142 A1 | 7/2007 | Abrams, Jr. |
| 2007/0171280 A1 | 7/2007 | Raveendran et al. |
| 2007/0171986 A1 | 7/2007 | Hannuksela |
| 2007/0206117 A1 | 9/2007 | Tian et al. |
| 2007/0208557 A1 | 9/2007 | Li et al. |
| 2007/0252894 A1 | 11/2007 | Satou et al. |
| 2008/0151101 A1 | 6/2008 | Tian et al. |
| 2009/0074070 A1 | 3/2009 | Yin et al. |
| 2009/0092944 A1 | 4/2009 | Pirker |
| 2009/0122186 A1 | 5/2009 | Rodriguez et al. |
| 2009/0168880 A1 | 7/2009 | Jeon et al. |
| 2009/0244840 A1 | 10/2009 | Takawa et al. |
| 2010/0020886 A1 | 1/2010 | Raveendran et al. |
| 2010/0171814 A1 | 7/2010 | Routhier et al. |
| 2013/0308707 A1 | 11/2013 | Raveendran et al. |

FOREIGN PATENT DOCUMENTS

| | | |
|---|---|---|
| CL | 01332005 | 10/2005 |
| CL | 10432005 | 12/2005 |
| CL | 10452005 | 12/2005 |
| CL | 2052001 | 1/2006 |
| CL | 14732005 | 1/2006 |
| CL | 5422006 | 8/2006 |
| CL | 5432006 | 9/2006 |
| CL | 05432006 | 9/2006 |
| CL | 5392006 | 11/2006 |
| CL | 05392006 | 11/2006 |
| CL | 5402006 | 11/2006 |
| CL | 5422006 | 11/2006 |
| CL | 5442006 | 2/2007 |
| CL | 02052001 | 12/2008 |
| CN | 1328747 A | 12/2001 |
| CN | 1372769 | 10/2002 |
| CN | 1383327 A | 12/2002 |
| CN | 1395800 A | 2/2003 |
| CN | 1436423 A | 8/2003 |
| CN | 1647540 A | 7/2005 |
| CN | 1669314 A | 9/2005 |
| EP | 0547460 | 6/1993 |
| EP | 0547460 A1 | 6/1993 |
| EP | 0644695 | 3/1995 |
| EP | 0690617 | 1/1996 |
| EP | 0690617 A2 | 1/1996 |
| EP | 0690617 A2 | 1/1996 |
| EP | 0946054 | 9/1999 |
| EP | 0946054 A1 | 9/1999 |
| EP | 0946054 A1 | 9/1999 |
| EP | 1005227 | 5/2000 |
| EP | 1022667 A2 | 7/2000 |
| EP | 1164792 | 12/2001 |
| EP | 1164792 A2 | 12/2001 |
| EP | 1164792 A2 | 12/2001 |
| EP | 1168731 | 1/2002 |
| EP | 1168731 A1 | 1/2002 |
| EP | 1168731 A1 | 1/2002 |
| EP | 1195992 A1 | 4/2002 |
| EP | 1209624 | 5/2002 |
| EP | 1209624 A1 | 5/2002 |
| EP | 1265373 A2 | 12/2002 |
| EP | 1505488 | 2/2005 |
| EP | 1505488 A1 | 2/2005 |
| EP | 1547016 A1 | 6/2005 |
| EP | 1615447 | 1/2006 |
| EP | 1615447 A1 | 1/2006 |
| EP | 1657835 A1 | 5/2006 |
| FR | 2646047 A1 | 10/1990 |
| JP | 5064175 A | 3/1993 |
| JP | H05344492 A | 12/1993 |
| JP | H0622298 A | 1/1994 |
| JP | H07135657 A | 5/1995 |
| JP | 7222145 A | 8/1995 |
| JP | H07203433 A | 8/1995 |
| JP | 7298272 A | 11/1995 |
| JP | 7312756 A | 11/1995 |
| JP | 8046969 A | 2/1996 |
| JP | 08102938 | 4/1996 |
| JP | 8130716 A | 5/1996 |
| JP | 08214210 | 8/1996 |
| JP | 8251594 A | 9/1996 |
| JP | 09018782 | 1/1997 |
| JP | H09503890 A | 4/1997 |
| JP | 09284770 | 10/1997 |
| JP | 10013826 A | 1/1998 |
| JP | 10302396 A | 11/1998 |
| JP | 10313463 A | 11/1998 |
| JP | H114260 A | 1/1999 |
| JP | 11243547 A | 9/1999 |
| JP | 11316843 A | 11/1999 |
| JP | 2000032474 A | 1/2000 |
| JP | 2000059774 A | 2/2000 |
| JP | 2000115778 A | 4/2000 |
| JP | 2000209553 A | 7/2000 |
| JP | 2000287173 A | 10/2000 |
| JP | 2000295626 | 10/2000 |
| JP | 2000350217 A | 12/2000 |
| JP | 2001045494 A | 2/2001 |
| JP | 2001169251 A | 6/2001 |
| JP | 3189292 B2 | 7/2001 |
| JP | 2001204026 A | 7/2001 |
| JP | 2001251629 A | 9/2001 |
| JP | 2001346207 A | 12/2001 |
| JP | 2001346214 A | 12/2001 |
| JP | 2002010259 A | 1/2002 |
| JP | 2002044668 A | 2/2002 |
| JP | 2002051336 A | 2/2002 |
| JP | 2002064817 A | 2/2002 |
| JP | 2002077833 A | 3/2002 |
| JP | 2002101416 A | 4/2002 |
| JP | 2002125227 A | 4/2002 |
| JP | 2002252834 A | 9/2002 |
| JP | 2002543714 T | 12/2002 |
| JP | 2003037844 A | 2/2003 |
| JP | 2003110474 A | 4/2003 |
| JP | 2003111079 A | 4/2003 |
| JP | 2003209837 A | 7/2003 |
| JP | 2003209848 A | 7/2003 |

(56) References Cited

FOREIGN PATENT DOCUMENTS

| | | |
|---|---|---|
| JP | 2003224847 A | 8/2003 |
| JP | 2003319341 A | 11/2003 |
| JP | 2003348583 A | 12/2003 |
| JP | 2004023288 A | 1/2004 |
| JP | 2004140488 A | 5/2004 |
| JP | 2004248124 A | 9/2004 |
| JP | 2005123732 A | 5/2005 |
| JP | 2005517342 A | 6/2005 |
| JP | 2006074684 A | 3/2006 |
| JP | 2007520126 T | 7/2007 |
| JP | 2008500935 A | 1/2008 |
| KR | 20020010171 A | 2/2002 |
| KR | 20020070199 A | 9/2002 |
| KR | 20030029507 A | 4/2003 |
| KR | 100389893 B1 | 6/2003 |
| KR | 20030073254 A | 9/2003 |
| KR | 1020040046320 | 6/2004 |
| KR | 20050089721 A | 9/2005 |
| KR | 20060011281 A | 2/2006 |
| KR | 1020010099660 | 11/2011 |
| TW | 536918 B | 6/2003 |
| WO | 9535628 | 12/1995 |
| WO | 9535628 A1 | 12/1995 |
| WO | 9739577 | 10/1997 |
| WO | 9932993 A1 | 7/1999 |
| WO | 9943157 | 8/1999 |
| WO | 0019726 | 4/2000 |
| WO | 0067486 | 11/2000 |
| WO | WO0156298 | 8/2001 |
| WO | 0166936 A1 | 9/2001 |
| WO | WO0169936 | 9/2001 |
| WO | 0178389 A1 | 10/2001 |
| WO | WO0178398 A1 | 10/2001 |
| WO | WO0225925 | 3/2002 |
| WO | WO0243398 | 5/2002 |
| WO | 02087255 | 10/2002 |
| WO | 02087255 A2 | 10/2002 |
| WO | 03052695 A2 | 6/2003 |
| WO | WO-03067778 A1 | 8/2003 |
| WO | WO2004008747 A2 | 1/2004 |
| WO | WO2004008757 A1 | 1/2004 |
| WO | 2004019273 | 3/2004 |
| WO | 2004019273 A1 | 3/2004 |
| WO | 2004054270 | 6/2004 |
| WO | 2004054270 A1 | 6/2004 |
| WO | WO2004049722 A1 | 6/2004 |
| WO | WO2004057460 A2 | 7/2004 |
| WO | WO2004070953 A2 | 8/2004 |
| WO | WO2004114667 A1 | 12/2004 |
| WO | WO2004114672 | 12/2004 |
| WO | WO2005006764 A1 | 1/2005 |
| WO | WO2005069917 | 8/2005 |
| WO | WO2005074147 A1 | 8/2005 |
| WO | WO2005081482 A1 | 9/2005 |
| WO | WO2005107266 | 11/2005 |
| WO | WO2005109900 | 11/2005 |
| WO | 2006099082 A2 | 9/2006 |
| WO | WO2006099242 | 9/2006 |

OTHER PUBLICATIONS

Sikota T., "MPEG Digital Video-Coding Standards," IEEE Signal Processing Magazine, IEEE Service Center, 1997-1999, pp. 82-100, vol. 14 (5), Piscataway, NJ, XP011089789.

C. Huang et al.: "A Robust Scene-Change Detection Method for Video Segmentation," IEEE Transactions on Circuits and Systems for Video Technology, vol. 11, No. 12, pp. 1281-1288, Dec. 2001.

D. Lelescu et al.: "Statistical Sequential Analysis for Real-Time Video Scene Change Detection on Compressed Multimedia Bitstream," IEEE Transactions on Multimedia, vol. 5, No. 1, pp. 106-117, Mar. 2003.

G.D. Haan et al.: "De-interlacing of video data," IEEE Transactions on Consumer Electronics, vol. 43, No. 3, pp. 1-7,1997.

Mihaela Van Der Schaar et al., A Hybrid Temporal-SNR Fine-Granular Scalability for Internet Video, IEEE Transactions on Circuits and Systems for Video Technology, IEEE Service Senter, vol. 11, No. 3, Mar. 2001.

R. Simonetti et al.: "Deinterfacing of HDTV Images for Multimedia Applications," Signal Processing of HDTV IV, Elsevier Science Publishers, pp. 765-772, 1993.

Rusert et al., "Enhanced interference wavelet video coding considering the interrelation of spatio-temporal transform and motion compensation," Signal Processing. Image Communication, Elsevier Science Publishers, vol. 19, No. 7, Aug. 2008, pp. 617-635, XP00004524456.

S.P. Ghael et al.: "Improvement Wavelet denoising via empirical Wiener filtering," Proceedings of SPIE, vol. 3169, pp. 1-11, Jul. 1997.

SMPTE RP 27.3-1989 "SMPTE Recommended Practice Specifications for Safe Action and Safe Title Areas Test Pattern for Television Systems" Society of Motion Picture and Television Engineers, pp. 1-3 Approved Mar. 29, 1989.

International Search Report—PCT/US2006/040709, International Search Authority-European Patent Office—Mar. 22, 2007.

Written Opinion—PCT/US2006/040709, International Search Authority—European Patent Office—Mar. 22, 2007.

International Preliminary Report on Patentability—PCT/US2006/040709, International Search Authority—The International Bureau of WIPO—Geneva, Switzerland—Apr. 23, 2008.

Wiegand, T. et al., "Draft ITU-R recommendation and final draft international standard of Joint Video Specification" Joint Video Team (JVT) of ISO/IEC MPEG & ITU-T VCEG. 8th Meeting: Geneva, Switzerland. May 27, 2003.

R4-030797, An Advanced Receiver Proposal for MIMO, TSG-RAN WG4 #28, Lucent Technologies. Sophia-Antipolis; Aug. 18-22, 2003, pp. 1-8.

Puri et al., "Video coding using the H.264/MPEG-4 AVC compression standard" Signal Processing. Image Communication, Elsevier Science Publishers, Amsterdam, NL, vol. 19, No. 9, Oct 1, 2004, pp. 793-849, XP004607150.

Taiwanese Search Report—095138289—TIPO—Oct. 10, 2009.

De Haan Gerard, et al., "Deinterlacing—An Overview," Proceeding of the IEEE, 1998, 86 (9) 1839-1857.

Mailaender, L., et al., "Linear MIMO equalization for CDMA downlink signals with code reuse", Wireless Communications, IEEE Transactions on, Sep. 2005, vol. 4, Issue 5, pp. 2423-2434.

3GPP2-C10-20040607-102, "Third Generation Partnership Project 2", TSG-C Working Group 1.2—Multimedia Services, Montreal, Quebec, Canada, May 17-20, 2004, Qualcomm.

Boyce, Jill M.: "Packet loss resilient transmission of MPEG video over the Internet" Signal Processing: Image Communication, Elsevier Science Publishers, Amsterdam, NL, vol. 15, No. 1-2, Sep. 1999, pp. 7-24, XP004180635.

Fablet R., et al., "Motion Recognition Using Nonparametric Image Motion Models Estimated From Temporal and Multiscale Co-Occurence Statistics", IEEE Transaction on Pattern analysis and machine Intelligence, vol. 25, No. 12, pp. 1619-1624, Dec. 2003.

Peh C.H., et al., "Synergizing Spatial and Temporal Texture", IEEE Transaction on Image Processing, vol. 11, No. 10, pp. 1179-1191, Oct. 2002.

D.L. Donoho et al.: "Ideal spatial adaptation by wavelet shrinkage," Biometrika, vol. 8, pp. 1-30, 1994.

F.M. Wang et al.: "Time recursive Deinterlacing for IDTV and Pyramid Coding," Signal Processing: Image Communications 2, pp. 1306-1309, 1990.

G.D. Haan et al.: "De-interlacing of video data," IEEE Transactions on Consumer Electronics, vol. 43, No. 3, pp. 11-7, 1997.

Girod et al., "Scalable codec architectures for Internet video-on-demand," Signals, Systems & Computers, 1997 Conference Record of the Thirty-First Asilomar Conference on Pacific Grove, CA, USA Nov. 2-5, 1997, Los Alamitos, CA, USA, IEEE Comput Soc. US. vo.

K. Jung et al.: "Deinterlacing using Edge based Motion Estimation," IEEE MWSCS, pp. 892-895, 1995.

Kwon et al., "Overview of H.264/MPEG-4 part 10," Journal of visual Communication and Image Representation, Academic Press, Inc., vol. 17, No. 2, Apr. 2006, pp. 186-216, XP005312621.

(56) References Cited

OTHER PUBLICATIONS

Liang, Y. & Tan, Y.P., "A new content-based hybrid video transcoding method," 2001 International Conference on Image Processing, Oct. 7-10, 2001, vol. 4, pp. 429-432.

P. Haavisto et al.: "Scan rate up-conversions using adaptive weighted median filtering," Signal Processing of HDTV II, Elsevier Science Publishers, pp. 703-710, 1990.

R. Simonetti et al.: "Deinterlacing of HDTV Images for Multimedia Applications," Signal Processing of HDTV IV, Elsevier Science Publishers, pp. 765-772, 1993.

Rusert et al., "Enhanced Interframe wavelet video coding considering the interrelation of spatio-temporal transform and motion compensation," Signal Processing. Image Communication, Elsevier Science Publishers, vol. 19, No. 7, Aug. 2004, pp. 617-635, XP00004524456.

S. Lee et al.: "Fast Scene Change Detection using Direct Feature Extraction from MPEG Compressed Videos," IEEE Transactions on Multimedia, vol. 2, No. 4, pp. 240-254, Dec. 2000.

S. Pei et al.: "Effective Wipe Detection in MPEG Compressed Video Using Macroblock Type Information," IEEE Transactions on Multimedia, vol. 4, No. 3, pp. 309-319, Sep. 2002.

Schaar et al., "A Hybrid Temporal-SNR Fine-Granular Scalability for Internet Video", IEEE Transactions on Circuits and Systems for Video Technology, Mar. 2001, pp. 318-331, vol. 11, No. 3, IEEE Service Center, XP011014178, ISSN: 1051-8215, DOI: 10.1109/76.911158.

Sikora T., "MPEG Digital Video-Coding Standards," IEEE Signal Processing Magazine, IEEE Service Center, 1997-1999, pp. 82-100, vol. 14 (5), Piscataway, NJ, XP011089789.

SMPTE RP 27.3-1989 "SMPTE Recommended Practice Specifications for Safe Action and Safe Title Areas Test Pattern for Television Systems," Society of Motion Picture and Television Engineers, Mar. 29, 1989, pp. 1-3.

S.P. Ghael et al.: "Improved Wavelet denoising via empirical Wiener filtering," Proceedings of SPIE, vol. 3169, pp. 1-11, Jul. 1997.

\* cited by examiner

ADAPTIVE GOP STRUCTURE IN VIDEO STREAMING

CLAIM OF PRIORITY UNDER 35 U.S.C. §119

The present Application for Patent claims priority to Provisional Application No. 60/727,640 entitled "A Method and Apparatus for Using an Adaptive GOP Structure in Video Streaming" filed Oct. 17, 2005, and assigned to the assignee hereof and hereby expressly incorporated by reference herein.

BACKGROUND

1. Field

The field of the invention is directed to encoding, more particularly the field relates to the removal of temporal redundancy achievable in encoding video through adaptively assigning frame types.

2. Background

In the 1990s television technology switched from using analog methods for representing and transmitting video to digital methods. Once it was accepted that the existing solid state technologies would support new methods for processing video, the benefits of digital video were quickly recognized. Digital video could be processed to match various types of receivers having different numbers of lines and line patterns that were either interlaced or progressive. The cable industry welcomed the opportunity to change the bandwidth-resolution tradeoff virtually on the fly, allowing up to twelve video channels or 7-8 channels of digital video that had superior picture quality to be transmitted in a bandwidth that formerly carried one analog channel of video. Digital pictures would no longer be affected by ghosts caused by multipath in transmission.

The new technology offered the possibility of high definition television (HDTV), having a cinema-like image and a wide screen format. Unlike the current aspect ratio that is 4:3, the aspect ratio of HDTV is 16:9, similar to a movie screen. HDTV can include Dolby Digital surround sound, the same digital sound system used in DVDs and many movie theaters. Broadcasters could choose either to transmit a high resolution HDTV program or send a number of lower resolution programs in the same bandwidth. Digital television could also offer interactive video and data services.

There are two underlying technologies that drive digital television. The first technology uses transmission formats that take advantage of the higher signal to noise ratios typically available in channels that support video. The second is the use of signal processing to remove unneeded spatial and temporal redundancy present in a single picture or in a sequence of pictures. Spatial redundancy appears in pictures as relatively large areas of the picture that have little variation in them. Temporal redundancy refers to parts of a picture that reappear in a later or earlier picture. By eliminating it, the duplication of data contained in successive pictures is minimized. Elimination is achieved by sending motion vector information—i.e., a pointer to a block of data—that will become a reference for the block being considered, and information that is indicative of the differences between the reference block and the block being processed to the video decoder.

Temporal compression is defined by the type of motion prediction allowed by the standard. MPEG2 allows three types of pictures: I (Intracoded) pictures, P (Predictively Coded), and B (Bidirectionally Coded) pictures. H.264 adds the "skip frame" encoding option.

I pictures are encoded on a stand alone basis. The MPEG2 standard allows I pictures to be compressed using spatial compression alone, though in more recent H.264 standard prediction within the I picture is allowed.

P pictures are predicted directly from the I picture or P picture that preceded it in time although individual blocks in a P picture can always be encoded on a stand alone basis using spatial compression. This option may be chosen if the best prediction block does not adequately reduce the number of bits needed to represent a P frame block.

References for B picture blocks are derived from the I or P pictures that straddle the frame to be encoded in time. For the MPEG2 standard, only 2 pictures, one ahead, one behind in time could to be used as a source of reference blocks for bidirectional prediction. In the H.264 standard up to 32 pictures can be used to find sources of reference blocks.

There is a need for innovative systems for determining how to appropriately assign an encoding type for a frame.

SUMMARY

One aspect of this aspect comprises a method of encoding video frames that comprises determining at least one metric indicative of a difference between a selected frame and at least one adjacent frame, the determination being based on motion information associated with the adjacent video frames, and adaptively assigning an encoding method for each of the video frames based on the determined metrics.

Yet another aspect of this aspect comprises an apparatus used for encoding video frames comprising a metrics module for determining at least one metric indicative of a difference between a selected frame and at least one adjacent frame, said metric being based on motion information and a decision module that adaptively assigns an encoding method for each of the plurality of frames based on the determined metrics.

Yet another aspect of this aspect comprises an apparatus used for encoding video frames that comprises a means for determining at least one metric indicative of a difference between a selected frame and at least one adjacent frame, said metric being based on motion information, and a means for adaptively assigning an encoding method for each of the frames based on the determined metric.

Yet another aspect of this aspect comprises a machine readable medium that comprises instructions that upon execution cause a machine to determine at least one metric indicative of a difference between a selected frame and at least one adjacent frame, said metric being based on motion information, and adaptively assign an encoding method for each of the frames based on the determined metric.

Yet another aspect of this aspect comprises a video compression processor comprising a configuration to determine at least one metric indicative of a difference between a selected frame and at least one adjacent frame, said metric based on motion information, and adaptively assign an encoding method for each of the frames based on the determined metric.

DETAILED DESCRIPTION

The following detailed description is directed to certain specific aspects of the invention. However, the invention can be embodied in a multitude of different ways as defined and covered by the claims. In this description, reference is made to the drawings wherein like parts are designated with like numerals throughout.

Figure 1:
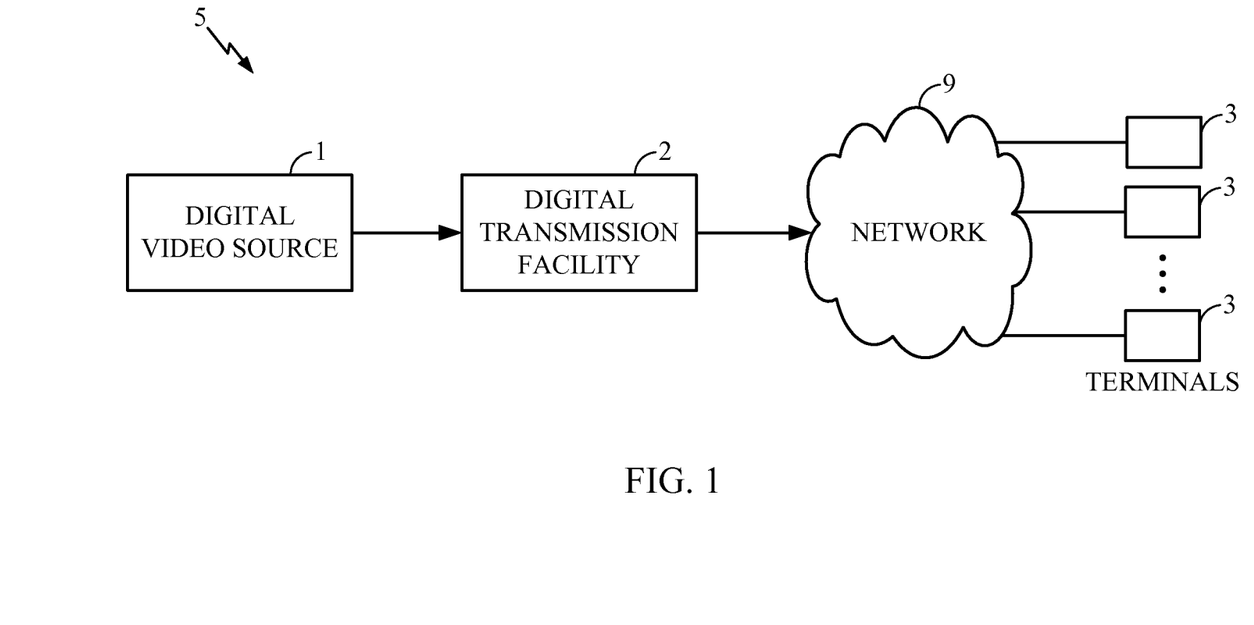
FIG. 1 is a block diagram illustrating a video transmission system.

FIG. 1 is a functional block diagram of a transmission system which supports the digital transmission of compressed video to a plurality of terminals. A source of digital video 1 is present, which might be a digital cable feed, an analog high signal/ratio source that is digitized, or the uncompressed digital output of a DVD player. The digital video may be compressed in the transmission facility 2 and there modulated onto a carrier for transmission through the network 9 to terminals 3.

The digital video may have one of two formats, either originating in a telecine, or originating in NTSC broadcast equipment. Distinguishing between the NTSC and telecined video and returning the latter to its original format may be beneficial because video compression gives best results when the properties of the source are known and used to select the ideally matching form of processing. Off-the-air video, for example, can originate in several ways. Broadcast video that is conventionally generated—in video cameras, broadcast studios, etc.—conforms in the United States to the NTSC standard. According the standard, each frame is made up of two fields. One field consists of the odd lines, the other, the even lines. While the frames are generated at approximately 30 frames/sec, the fields are records of the television camera's image that are 1/60 sec apart. Film on the other hand is shot at 24 frames/sec, each frame consisting of a complete image. An NTSC compatible version of the film is created for broadcast in a telecine machine in which the film is projected onto a video imager running at the nominal NTSC frame rate.

Figure 2:
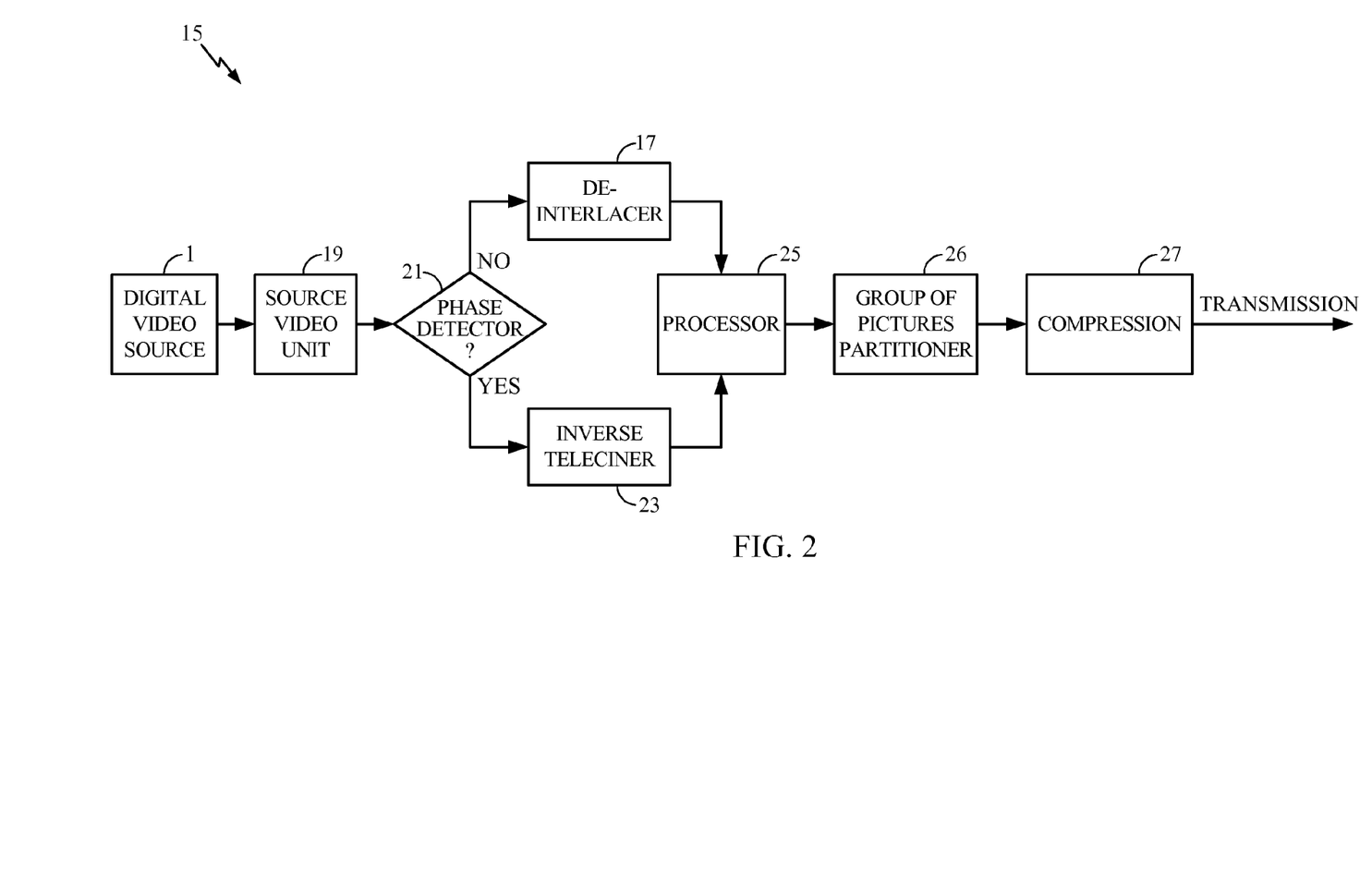
FIG. 2 is a block diagram illustrating further aspects of components of FIG. 1.

In FIG. 2, a signal preparation unit 15 may be used to prepare the data for transmission is shown in block diagram form. Digital video frames, recovered in source video unit 19, are passed to the phase detector 21. The phase detector 21 is to first distinguish between video that originated in a telecine and that which began in a standard broadcast format. If the decision is made that the video was telecined (the YES decision path exiting phase detector 21), the telecined video is returned to its original format inverse telecine 23. Redundant frames are identified and eliminated and fields derived from the same video frame were rewoven into a complete image. Since the sequence of reconstructed film images were photographically recorded at regular intervals of 1/24 of a second, the motion estimation process performed in compression unit 27 is more accurate using the inverse telecined images rather than the telecined data, which has an irregular time base.

When conventional NTSC video is recognized (the NO path from 21) it is deinterlaced in block 17 for compression, resulting in video fields that were recorded at intervals of 1/60 of a second. Fields rather than frames are produced by block 17 because fields are closer together in time than frames, and were scanned at one instant of time. For both reasons, the likelihood of finding a similar block that can be used as a reference for motion estimation is higher with fields than frames.

The decision process is continuous as the video frames stream from source 19 because the origination point of the video stream may change at any time. Video conforming to the NTSC standard may be inserted into the telecine's video output, for example, as a commercial. It is desirable that the decision made in detector 21 be accurate. Processing conventionally originated NTSC as if it were telecined would cause a serious loss of the information in the video signal.

The signal preparation unit 15 also incorporates group of pictures (GOP) partitioner 26, to adaptively change the composition of the group of pictures coded together. MPEG2, an older video compression standard, does not require that the GOP have a regular structure, though one can be imposed. The MPEG2 sequence always begins with an I frame, i.e., one which has been encoded without reference to previous pictures. The MPEG2 GOP format is usually prearranged at the encoder by fixing the spacing in the GOP of the P or predictive pictures that follow the I frame. P frames are pictures that have been in part predicted from previous I or P pictures. The frames between the starting I frame, and the succeeding P frames are encoded as B frames. A "B" frame (B stands for bidirectional) can use the previous and next I or P pictures either individually or simultaneously as reference. The number of bits needed to encode an I frame on the average exceeds the number of bits needed to encode a P frame; likewise the number of bits needed to encode a P frame on the average exceeds that required for a B frame. A skipped frame, if it is used, may require no bits for its representation.

One benefit of using P and B frames, and in more recent compression algorithms, the skipping of frames is that it is possible to reduce video transmission sizes. When temporal redundancy is high—i.e., by eliminating temporal redundancy there is little change from picture to picture—use of P, B, or skipped pictures efficiently represents the video stream, because I or P pictures decoded earlier are used later as references to decode other P or B pictures.

The group of pictures partitioner 26 adaptively encodes frames to minimize temporal redundancy. Differences between frames are quantified and a decision to represent the picture by a I, P, B, or skipped frame is automatically made after suitable tests are performed on the quantified differences. The processing in GOP partitioner 26 and compressor 27 is aided by preprocessor 25, which provides two dimensional filtering for noise removal.

Adaptive encoding process has advantages not available in a "fixed" encoding process. A fixed process ignores the possibility that little change in content has taken place; however, an adaptive procedure allows far more B frames to be inserted between each I and P, or two P frames, thereby reducing the number of bits needed to adequately represent the sequence of frames. Conversely, e.g., in a fixed encoding process, when the change in video content is significant, the efficiency of P frames is greatly reduced because the difference between the predicted and the reference frames is too large. Under these conditions, matching objects may fall out of the motion search regions, or the similarity between matching objects is reduced due to distortion caused by changes in camera angle. An adaptive encoding process may beneficially be used to optionally determine when P frames should be encoded.

Figure 3A:
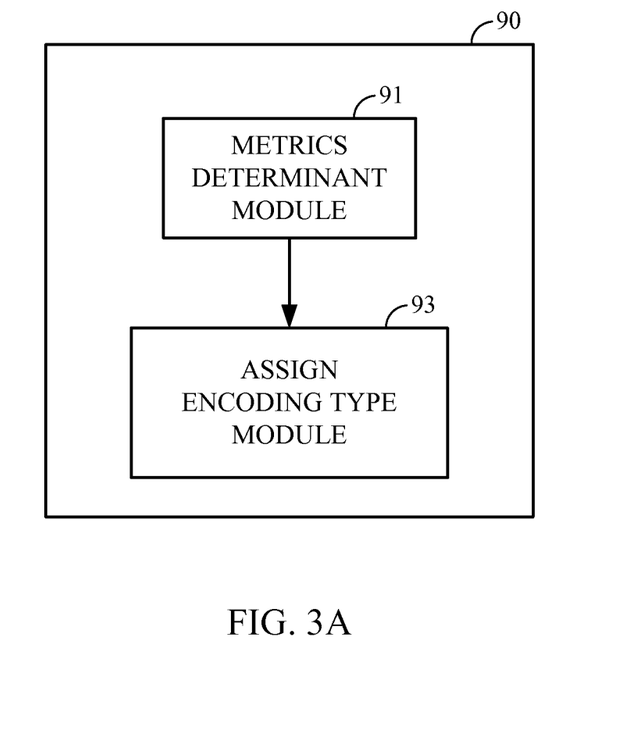
FIG. 3A is a block diagram exhibiting the structure of a system that assigns encoding types to frames.

In the system disclosed herein, the types of conditions described above are automatically sensed. The adaptive encoding process described herein is flexible and is made to adapt to these changes in content. The adaptive encoding process evaluates a frame difference metric, which can be thought of as measure of distance between frames, with the same additive properties of distance. In concept, given frames $F_1$, $F_2$, and $F_3$ having the inter-frame distances $d_{12}$ and $d_{23}$, the distance between $F_1$ and $F_3$ is taken as being at least $d_{12}+d_{23}$. Frame assignments are made on the basis of this distance-like metric and other measures. The principle of operation of the GOP partitioner is shown in FIG. 3A, in which the GOP partitioner 26 is separated into its functional components. The GOP system 90 in FIG. 3A is made up of a metrics determinant module 91 and an assign encoding type module 93.

The GOP partitioner 26 operates by assigning picture types to frames as they are received. The picture type indicates the method of prediction that may be used to code each block:

I-pictures are coded without reference to other pictures. Since they stand alone they provide access points in the data stream where decoding can begin. An I encoding type is assigned to a frame if the "distance" to its predecessor frame exceeds a scene change threshold.

P-pictures can use the previous I or P pictures for motion compensated prediction. They use blocks in the previous fields or frames that may be displaced from the block being predicted as a basis for encoding. After the reference block is subtracted from the block being considered, the residual block is encoded, typically using the discrete cosine transform for the elimination of spatial redundancy. A P encoding types is assigned to a frame if the "distance" between it and the last frame assigned to be a P frame exceeds a second threshold, which is typically less than the first.

B-frame pictures can use the previous and next P- or I-pictures for motion compensation as described above. A block in a B picture can be forward, backward or bidirectionally predicted; or it could be intra-coded without reference to other frames. In H.264 a reference block can be a linear combination of as many as 32 blocks from as many frames. If the frame cannot be assigned to be an I or P type, it is assigned to be a B type, if the "distance" from it to its immediate predecessor is greater than a third threshold, which typically is less than the second threshold. If the frame cannot be assigned to become a B-frame encoded, it is assigned to "skip frame" status. This frame can be skipped because it is virtually a copy of a previous frame. The first threshold, i.e., the scene change threshold, the second threshold, and/or the third threshold may be determined by simulation.

Evaluating a metric that quantifies the difference between adjacent frames in the display order is the first part of this processing that takes place in GOP partitioner 26. This metric is the distance referred to above; with it, every frame is evaluated for its proper type. Thus, the spacing between the I and adjacent P, or two successive P frames, can be variable. Computing the metric begins by processing the video frames with a block-based motion compensator, a block being the basic unit of video compression, composed usually of 16×16 pixels, though other block sizes such as 8×8, 4×4 and 8×16 are possible. For frames consisting of two deinterlaced fields that are present at the output of block 17, the motion compensation is done on a field basis, the search for the reference blocks taking place in fields rather than frames. For a block in the first field of the current frame a forward reference block is found in fields of the frame that is adjacent to and follows it; likewise a backward reference block found in fields of the frame that immediately precedes the current field, i.e., is also adjacent to it. The current blocks are assembled into a compensated field. The process continues with the second field of the frame. The two compensated fields are combined to form a forward and a backward compensated frame.

For frames created in the inverse telecine 23, the search for reference blocks may be on a frame basis only, since only reconstructed film frames are generated. Two reference blocks from the frames immediately adjacent to the current one and two differences, forward and backward, are found, leading also to a forward and backward compensated frame. In summary, the motion compensator produces motion vectors and difference metrics for every block. Note that the differences in the metric are evaluated between a block in the field or frame being considered and a block that best matches it, either in a preceding field or frame or a field or frame that immediately follows it, depending on whether a forward or backward difference is being evaluated. Only luminance values enter into this calculation.

The motion compensation step thus generates two sets of differences. These are between blocks of current values of luminance and the luminance values in reference blocks taken from frames that are immediately ahead and immediately behind the current one in time. The absolute value of each forward and each backward difference is determined for each pixel in a block and each is separately summed over the entire frame. Both fields are included in the two summations when the deinterlaced NTSC fields that comprise a frame are processed. In this way, $SAD_P$, and $SAD_N$, the summed absolute values of the forward and backward differences are found.

For every frame a SAD ratio is calculated using the relationship, $$\gamma = \frac{\varepsilon + SAD_P}{\varepsilon + SAD_N} \quad (1)$$

where $SAD_P$ and $SAD_N$ are the summed absolute values of the forward and backward differences respectively. A small positive number is added to the numerator $\varepsilon$ to prevent the "divide-by-zero" error. A similar $\varepsilon$ term is added to the denominator, further reducing the sensitivity of $\gamma$ when either $SAD_P$ or $SAD_N$ is close to zero.

In an alternate aspect, the difference can be the SSD, the sum of squared differences, and SAD, the sum of absolute differences, or the SATD, in which the blocks of pixel values are transformed by applying the two dimensional Discrete Cosine Transform to them before differences in block elements are taken. The sums are evaluated over the area of active video, though a smaller area may be used in other aspects.

The luminance histogram of every frame as received (non-motion compensated) is also computed. The histogram operates on the DC coefficient, i.e., the (0,0) coefficient, in the 16×16 array of coefficients that is the result of applying the two dimensional Discrete Cosine Transform to the block of luminance values if it were available. Equivalently the average value of the 256 values of luminance in the 16×16 block may be used in the histogram. For images whose luminance depth is eight bits, the number of bins is set at 16. The next metric evaluates the histogram difference $$\lambda = \frac{1}{N} \sum_{i=1}^{16} |N_{Pi} - N_{Ci}| \quad (2)$$

In the above, $N_{Pi}$ is the number of blocks from the previous frame in the $i^{th}$ bin, and $N_{ci}$ is the number of blocks from the current frame that belong in the $i^{th}$ bin, N is the total number of blocks in a frame.

These intermediate results are assembled to form the current frame difference metric as $$M = \frac{\gamma_C}{\gamma_P} + \lambda(2\lambda + 1), \quad (3)$$

where $\gamma_C$ is the SAD ratio based on the current frame and $\gamma_P$ is the SAD ratio based on the previous frame. If a scene has smooth motion and its luma histogram barely change, then $M \approx 1$. If the current frame displays an abrupt scene change, then $\gamma_C$ will be large and $\gamma_P$ should be small. The ratio $$\frac{\gamma_C}{\gamma_P}$$

instead of $\gamma_C$ alone is used so that the metric is normalized to the activity level of the context.

Figure 3B:
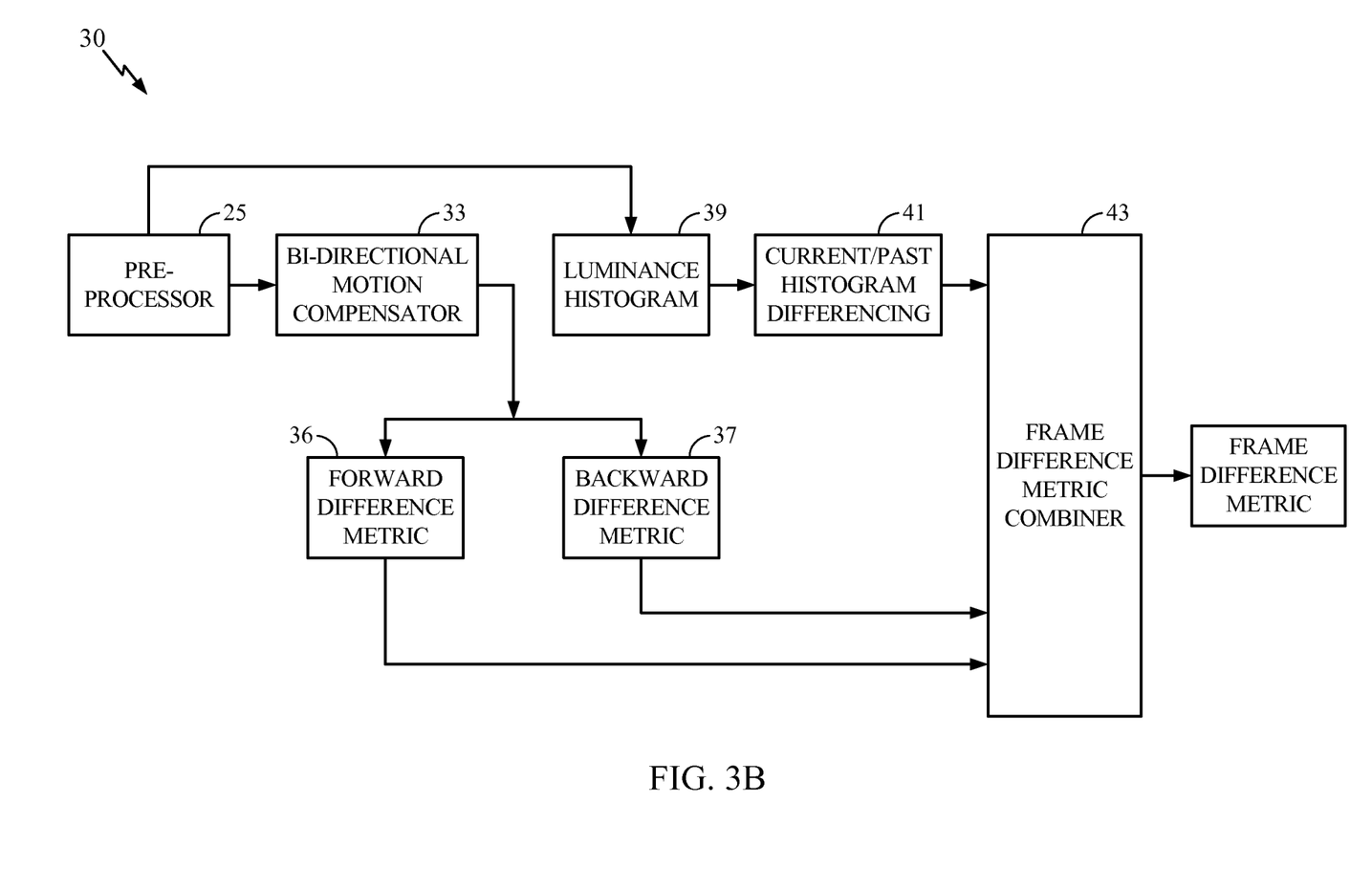
FIG. 3B is a flowchart that describes the process whereby one of the components of FIG. 2 computes a frame difference metric.

Dataflow 30 in FIG. 3B illustrates certain components that may be used to compute the frame difference metric. Preprocessor 25 delivers interlaced fields in the case of video having a NTSC source, and frames of film images when the source of the video is the result of inverse telecine to the bi-directional motion compensator 33. The bi-directional motion compensator 33 operates on a field (or frame in the case of a cinematic source of video) by breaking it into blocks of 16×16 pixels and comparing each block to all 16×16 blocks in a defined area of a field of the previous frame. The block which provides the best match is selected and subtracted from the current block. The absolute values of the differences is taken and the result summed over the 256 pixels that comprise the current block. When this is done for all current blocks of the field, and then for both fields the quantity $SAD_N$, the backward difference metric has been computed by a backward difference module 37. A similar procedure may be performed by a forward difference module 36. The forward difference module 36 uses the frame which is immediately ahead of the current one in time as a source of reference blocks to develop the $SAD_P$, the forward difference metric. The same estimation process, albeit done using the recovered film frames, takes place when the input frames are formed in the inverse telecine. The histograms needed to complete the computation of the frame difference metric are formed in histogram difference module 41. Each 16×16 block is assigned to a bin based on the average value of its luminance. This information is formed by adding all 256 pixel luminance values in a block together, normalizing it by 256 if desired, and incrementing the count of the bin into which the average value would have been placed. The calculation is done once for each pre-motion compensated frame, the histogram for the current frame becoming the histogram for the previous frame when a new current frame arrives. The two histograms are differenced and normalized by the number of blocks in histogram difference module 41 to form $\lambda$, defined by Eq. 2. These results are combined in frame difference combiner 43, which uses the intermediate results found in histogram difference module 39, forward and backward difference modules 36 and 36 to evaluate the current frame difference defined in Eq. (3).

Figure 4:
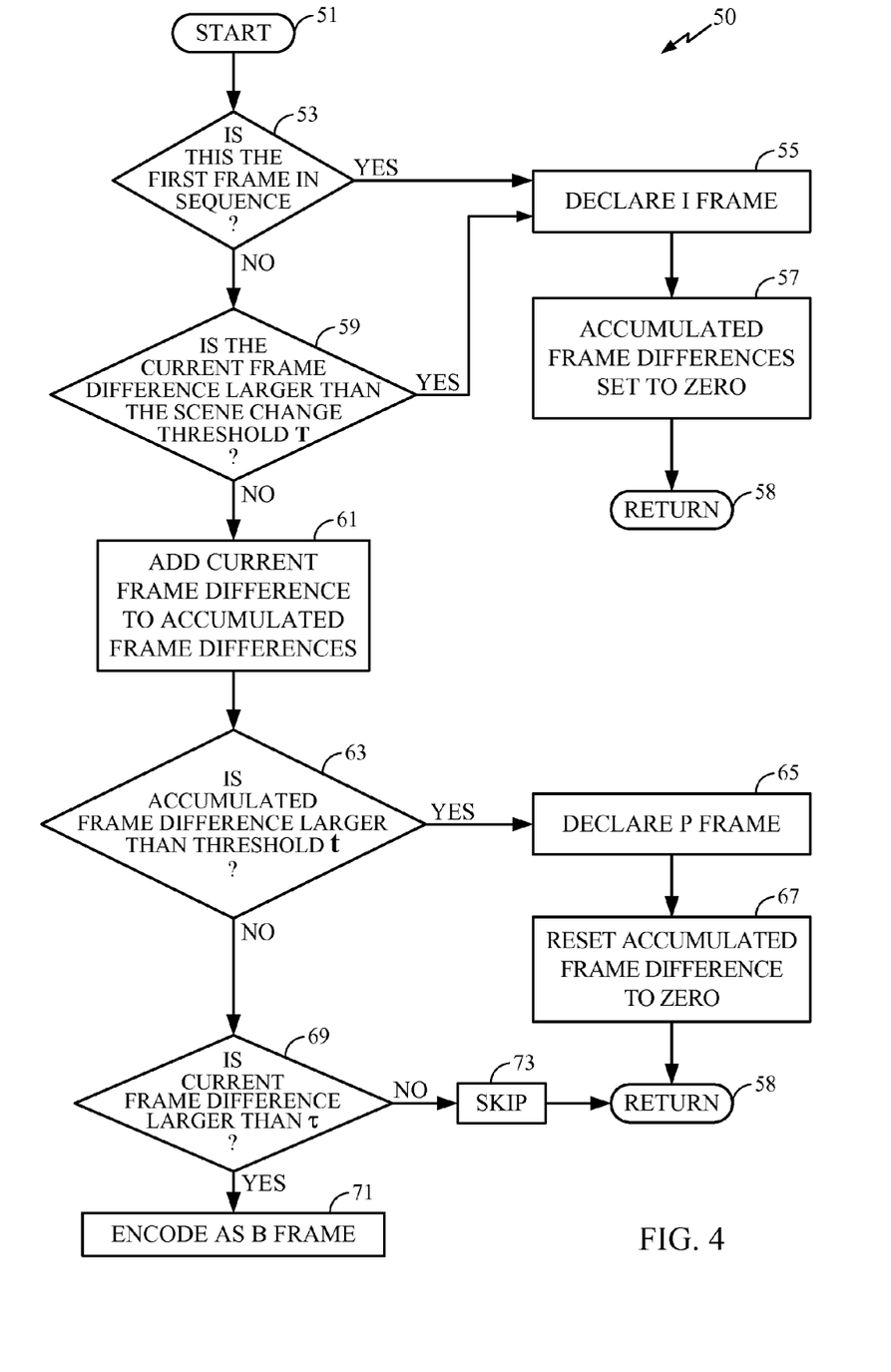
FIG. 4 is a flowchart illustrating the procedure whereby components in FIGS. 2 and 3 assign compression types to a plurality of video frames using the frame difference metric.

Flowchart 50 in FIG. 4 illustrates a process of assigning compression types to frames. In one aspect M, the current frame difference defined in Eq. 3, is the basis for all decisions made with respect to frame assignments. As decision block 53 indicates, if a frame under consideration is the first in a sequence, the decision path marked YES is followed to block 55, thereby declaring the frame to be an I frame. The accumulated frame differences is set to zero in block 57, and the process returns (in block 58) to the start block 53. If the frame being considered is not the first frame in a sequence, the path marked NO is followed from block 53 where the decision was made, and in test block 59 the current frame difference is tested against the scene change threshold. If the current frame difference is larger than that threshold, the decision path marked YES is followed to block 55, again leading to the assignment of an I-frame. If the current frame difference is less than the scene change threshold, the NO path is followed to block 61 where the current frame difference is added the accumulated frame difference. Continuing through the flowchart at decision block 63, the accumulated frame difference is compared with threshold t, which is in general less than the scene change threshold. If the accumulated frame difference is larger than t, control transfers to block 65, and the frame is assigned to be a P frame; the accumulated frame difference is then reset to zero in step 67. If the accumulated frame difference is less than t, control transfers from block 63 to block 69. There the current frame difference is compared with τ, which is less than t. If the current frame difference is smaller than τ, the frame is assigned to be skipped in block 73; if the current frame difference is larger than τ, the frame is assigned to be a β frame.

The system of flowchart 30 and components or steps thereof, can be implemented by hardware, software, firmware, middleware, microcode, or any combination thereof. Each functional component of flowchart 30, including the preprocessor 35, the bidirectional motion compensator 33, the toward and backward difference metric modules 36 and 37, the histogram difference module 41, and the frame difference metric combiner 43, may be realized as a standalone component, incorporated as hardware, firmware, middleware in a component of another device, or be implemented in microcode or software that is executed on the processor, or a combination thereof. When implemented in software, firmware, middleware or microcode, the program code or code segments that perform the desired tasks may be stored in a machine readable medium such as a storage medium. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents.

The received and processed data can be stored in a storage medium which can include, for example, a chip configured storage medium (e.g., ROM, RAM) or a disc-type storage medium (e.g., magnetic or optical) connected to the processor 36. In some aspects, the combiner 43 can contain part or all of the storage medium.

In an alternate aspect another frame encoding complexity indicator M* is defined as $$M^* = M \times \min(1, \alpha \max(0, SAD_P - s) \times \max(0, MV_P - m)), \quad (4)$$

where $\alpha$ is a scaler, $SAD_P$ is the SAD with forward motion compensation, $MV_P$ is the sum of lengths measured in pixels of the motion vectors from the forward motion compensation, and s and m are two threshold numbers that render the frame encoding complexity indicator to zero if $SAD_P$ is lower than s or $MV_P$ is lower than m. M* would be used in place of the current frame difference in flowchart 50 of FIG. 4. As can be seen, M* is different from M only if the forward motion compensation shows a low level of movement. In this case, M is smaller than M.

*M* can be used in place of M, the current frame difference, in flowchart 50.

It is noted that the aspects may be described as a process which is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

It should also be apparent to those skilled in the art that one or more elements of a device disclosed herein may be rearranged without affecting the operation of the device. Similarly, one or more elements of a device disclosed herein may be combined without affecting the operation of the device. Those of ordinary skill in the art would understand that information and signals may be represented using any of a variety of different technologies and techniques. Those of ordinary skill would further appreciate that the various illustrative logical blocks, modules, and algorithm steps described in connection with the examples disclosed herein may be implemented as electronic hardware, firmware, computer software, middleware, microcode, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed methods.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

In addition, the various illustrative logical blocks, components, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples and additional elements may be added without departing from the spirit or scope of the disclosed method and apparatus. The description of the aspects is intended to be illustrative, and not to limit the scope of the claims.

What is claimed is:

1. A method of encoding video frames comprising:
   determining at least one metric indicative of a difference between a selected video frame and at least one adjacent video frame, wherein the metric is determined according to $$M = \frac{\gamma_C}{\gamma_P} + \lambda(2\lambda + 1), \quad (3)$$

where $\gamma_C$ is a ratio of luminance value differences between the selected video frame and each of a preceding adjacent video frame and a following adjacent video frame, $\gamma_P$ is a preceding ratio of luminance value differences for the preceding adjacent video frame, and $\lambda$ is a luminance histogram difference between the selected video frame and the preceding adjacent video frame; and
   adaptively assigning an encoding method to the selected video frame based on the determined metric, comprising:
      encoding the selected video frame as an intra-predictively coded (I) frame type when the determined metric is larger than a first threshold value indicative of a scene change;
      encoding the selected video frame as an unidirectional inter-predictively coded (P) frame type when the determined metric is larger than a second threshold value and less than the first threshold value, wherein the second threshold value is less than the first threshold value; and
      encoding the selected video frame as a bidirectional inter-predictively coded (B) frame type when the determined metric is larger than a third threshold value and less than the second threshold value, wherein the third threshold value is less than the second threshold value.

2. The method of claim 1, wherein the assigned encoding method comprises skipping encoding of the selected frame.

3. The method of claim 1, wherein at least one of the first threshold value, the second threshold value, and the third threshold value is determined by simulation.

4. The method of claim 1, wherein the determined metric is set to zero if the selected frame is encoded as the I frame type.

5. The method of claim 1, wherein the encoding method assigned to the selected frame comprises skipping encoding of the selected frame when the third threshold value is larger than the determined metric.

6. The method of claim 1, wherein the determined metric comprises an accumulated frame difference that includes frame differences associated with previously encoded B frames.

7. The method of claim 1, wherein the ratio of luminance value differences is based on a first difference between the selected video frame and the preceding adjacent video frame that precedes the selected video frame in time, and a second difference between the selected video frame and the following adjacent video frame that follows the selected video frame in time.

8. An apparatus for encoding video frames, comprising a processor including a metrics module and a decision module, wherein:

the metrics module determines at least one metric indicative of a difference between a selected video frame and at least one adjacent frame, wherein the metric is determined according to $$M = \frac{\gamma_C}{\gamma_P} + \lambda(2\lambda + 1), \quad (3)$$

where $\gamma_C$ is a ratio of luminance value differences between the selected video frame and each of a preceding adjacent video frame and a following adjacent video frame, $\gamma_P$ is a preceding ratio of luminance value differences for the preceding adjacent video frame, and $\lambda$ is a luminance histogram difference between the selected video frame and the preceding adjacent video frame; and the decision module adaptively assigns an encoding method to the selected video frame based on the determined metric, wherein the adaptively assigned encoding method comprises:

encoding the selected video frame as an intra-predictively coded (I) frame type when the determined metric is larger than a first threshold value indicative of a scene change;

encoding the selected video frame as an unidirectional inter-predictively coded (P) frame type when the determined metric is larger than a second threshold value and less than the first threshold value, wherein the second threshold value is less than the first threshold value; and encoding the selected video frame as a bidirectional inter-predictively coded (B) frame type when the determined metric is larger than a third threshold value and less than the second threshold value, wherein the third threshold value is less than the second threshold value.

9. The apparatus of claim 8, wherein the assigned encoding method comprises skipping encoding of the selected frame.

10. The apparatus of claim 8, wherein the metrics module sets the determined metric to zero if the selected frame is encoded as the I frame type.

11. The apparatus of claim 8, wherein the decision module skips encoding of the selected frame when the third threshold value is larger than the determined metric.

12. The apparatus of claim 8, wherein the determined metric comprises an accumulated frame difference that includes frame differences associated with previously encoded B frames.

13. The apparatus of claim 8, wherein the metrics module determines the ratio of luminance value differences based on a first difference between the selected video frame and the preceding adjacent video frame that precedes the selected video frame in time, and a second difference between the selected video frame and the following adjacent video frame that follows the selected video frame in time.

14. An apparatus for encoding video frames, comprising:
means for determining at least one metric indicative of a difference between a selected frame and at least one adjacent frame, wherein the metric is determined according to $$M = \frac{\gamma_C}{\gamma_P} + \lambda(2\lambda + 1), \quad (3)$$

where $\gamma_C$ is a ratio of luminance value differences between the selected video frame and each of a preceding adjacent video frame and a following adjacent video frame, $\gamma_P$ is a preceding ratio of luminance value differences for the preceding adjacent video frame, and $\lambda$ is a luminance histogram difference between the selected video frame and the preceding adjacent video frame; and means for adaptively assigning an encoding method to the selected video frame based on the determined metric, comprising:

the selected video frame as an intra-predictively coded (I) frame type when the determined metric is larger than a first threshold value indicative of a scene change;

the selected video frame as an unidirectional inter-predictively coded (P) frame type when the determined metric is larger than a second threshold value and less than the first threshold value, wherein the second threshold value is less than the first threshold value; and the selected video frame as a bidirectional inter-predictively coded (B) frame type when the determined metric is larger than a third threshold value and less than the second threshold value, wherein the third threshold value is less than the second threshold value.

15. The apparatus of claim 14, wherein the means for adaptively assigning the encoding method comprises skipping encoding of the selected frame.

16. The apparatus of claim 14, wherein the determined metric is set to zero if the selected frame is encoded as an I frame type.

17. The apparatus of claim 14, wherein at least one of the first threshold value, the second threshold value, and the third threshold value is determined by simulation.

18. The apparatus of claim 14, wherein the means for adaptively assigning the encoding method further comprises skipping encoding of the selected frame when the third threshold value is larger than the metric.

19. The apparatus of claim 14, wherein the determined metric comprises an accumulated frame difference that includes frame differences associated with previously encoded B frames.

20. The apparatus of claim 14, wherein the ratio of luminance value differences is based on a first difference between the selected video frame and the preceding adjacent video frame that precedes the selected video frame in time, and a second difference between the selected video frame and the following adjacent video frame that follows the selected video frame in time.

21. A non-transitory machine readable medium comprising instructions for encoding video frames, wherein the instructions upon execution cause a machine to:

determine at least one metric indicative of a difference between a selected frame and adjacent frames, wherein the metric is determined according to $$M = \frac{\gamma_C}{\gamma_P} + \lambda(2\lambda + 1), \quad (3)$$

where $\gamma_C$ is a ratio of luminance value differences between the selected video frame and each of a preceding adjacent video frame and a following adjacent video frame, $\gamma_P$ is a preceding ratio of luminance value differences for the preceding adjacent video frame, and $\lambda$ is a luminance histogram difference between the selected video frame and the preceding adjacent video frame; and adaptively assign an encoding method to the selected video frame based on the determined metric, wherein the adaptively assigned encoding method comprises:

encoding the selected video frame as an intra-predictively coded (I) frame type when the determined metric is larger than a first threshold value indicative of a scene change;

encoding the selected video frame as an unidirectional inter-predictively coded (P) frame type when the determined metric is larger than a second threshold value and less than the first threshold value, wherein the second threshold value is less than the first threshold value; and encoding the selected video frame as a bidirectional inter-predictively coded (B) frame type when the determined metric is larger than a third threshold value and less than the second threshold value, wherein the third threshold value is less than the second threshold value.

22. A video encoding processor comprising a configuration to:

determine at least one metric indicative of a difference between a selected frame and adjacent frames, wherein the metric is determined according to $$M = \frac{\gamma_C}{\gamma_P} + \lambda(2\lambda + 1), \quad (3)$$

where $\gamma_C$ is a ratio of luminance value differences between the selected video frame and each of a preceding adjacent video frame and a following adjacent video frame, $\gamma_P$ is a preceding ratio of luminance value differences for the preceding adjacent video frame, and $\lambda$ is a luminance histogram difference between the selected video frame and the preceding adjacent video frame; and adaptively assign an encoding method for the selected frame based on the determined metric, wherein the adaptively assigned encoding method comprises:

encoding the selected frame as an intra-predictively coded (I) frame type when the determined metric is larger than a first threshold value indicative of a scene change;

encoding the selected frame as an inter-predictively coded (P) frame type when the determined metric is larger than a second threshold value and less than the first threshold value, wherein the second threshold value is less than the first threshold value; and encoding the selected frame as a bidirectional inter-predictively coded (B) frame type when the determined metric is larger than a third threshold value and less than the second threshold value, wherein the third threshold value is less than the second threshold value.

\* \* \* \* \*